(12) United States Patent
Kosugi et al.

(10) Patent No.: US 12,358,422 B2
(45) Date of Patent: Jul. 15, 2025

(54) VEHICLE CONTROL DEVICE, VEHICLE, VEHICLE CONTROL METHOD, AND NON-TRANSITORY COMPUTER-READABLE MEDIUM STORING VEHICLE CONTROL PROGRAM

(71) Applicant: TOYOTA JIDOSHA KABUSHIKI KAISHA, Toyota (JP)

(72) Inventors: Toshihiko Kosugi, Toyota (JP); Wataru Kusama, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 230 days.

(21) Appl. No.: 18/299,752

(22) Filed: Apr. 13, 2023

(65) Prior Publication Data

US 2023/0382295 A1 Nov. 30, 2023

(30) Foreign Application Priority Data

May 26, 2022 (JP) .................................. 2022-086360

(51) Int. Cl.
*B60Q 1/34* (2006.01)
*B62D 1/04* (2006.01)

(52) U.S. Cl.
CPC ............. *B60Q 1/346* (2013.01); *B62D 1/046* (2013.01)

(58) Field of Classification Search
CPC ................................ B60Q 1/346; B60Q 1/046
See application file for complete search history.

(56) References Cited

U.S. PATENT DOCUMENTS

| 8,046,133 | B2* | 10/2011 | Akuta | B62D 6/002 |
| | | | | 701/42 |
| 2015/0336505 | A1* | 11/2015 | Suzuki | B60Q 1/40 |
| | | | | 340/476 |
| 2017/0166114 | A1* | 6/2017 | Kim | B62D 15/021 |
| 2018/0258616 | A1* | 9/2018 | Kiyota | G06T 1/00 |

FOREIGN PATENT DOCUMENTS

| JP | 2003237461 | A | * | 8/2003 | |
| JP | 2007235690 | A | | 9/2007 | |
| JP | 4553317 | B | * | 3/2008 | |
| JP | 2010018245 | A | * | 1/2010 | |
| JP | 4553317 | B2 | * | 9/2010 | ......... B60Q 1/42 |
| JP | 2011088601 | A | * | 5/2011 | |

* cited by examiner

*Primary Examiner* — Peter D Nolan
*Assistant Examiner* — Matthew Cobb
(74) *Attorney, Agent, or Firm* — Dickinson Wright, PLLC (57) ABSTRACT

A vehicle control device including: a memory; and a processor coupled to the memory, the processor being configured to: set, based on a vehicle speed, a transition condition of a turning angle of a tire for canceling a turn signal, and in a case in which the turning angle of the tire satisfies the transition condition that has been set, due to a steering wheel being steered while the turn signal is in an on state, carry out control to switch the turn signal to an off state.

7 Claims, 13 Drawing Sheets

|     | Name of State | Explanation of State |
| --- | --- | --- |
| (1) | Cancellation Preparation Off | State in which no preparation is made for turn cancellation using pinion angle |
| (2) | Cancellation Preparation | State in which preparation is made for turn cancellation using pinion angle (Steering is operated in turn signal lighting direction) |
| (3) | Cancellation | State in which turn cancellation using pinion angle has been established (Operation returning steering to neutral vicinity is performed) |
| (4) | Pinion Angle Abnormality | State in which pinion angle is abnormal, and in which cancellation control according to pinion angle is stopped |

FIG.8

| | Name of Condition | Establishment Conditions | | | Explanation of Condition |
|---|---|---|---|---|---|
| A | Cancellation Preparation Start | During Right Turn | | EPSSA < [CNPR] | Case in which steering has been steered to certain angle or greater |
| | | During Left Turn | | EPSSA > [CNPL] | |
| B | Cancellation Preparation Release | During Right Turn | AND | During Right Turn SW Operation | Case in which steering has been operated toward neutral vicinity with turn switch in re-operation or operation continuation state |
| | | | | EPSSA ≥ [CNPCR] | |
| | | During Left Turn | AND | During Left Turn SW Operation | |
| | | | | EPSSA ≤ [CNPCL] | |
| C | Cancellation Establishment | During Right Turn | AND | Without Right Turn SW Operation | Case in which steering operation toward neutral vicinity has been carried out in state in which there is no re-operation or operation continuation of turn switch |
| | | | | EPSSA ≥ [CNR] | |
| | | During Left Turn | AND | Without Left Turn SW Operation | |
| | | | | EPSSA ≤ [CNL] | |
| D | Pinion Angle Abnormality | Common for Left and Right | OR | EPSTS1 = 1 | When pinion angle is abnormal |
| | | | | EPSSAINV = 1 | When pinion angle is invalid |
| E | Pinion Angle Normality | Common for Left and Right | AND | EPSTS1 = 0 | When pinion angle is normal |
| | | | | EPSSAINV = 0 | When pinion angle is normal |

| Abbreviated Notation | Content |
|---|---|
| SW | Switch |
| EPSSA | Steering Angle Signal |
| EPSTS1 | Steering Angle Signal Abnormality |
| EPSSAINV | Steering Angle Signal Invalidity |

FIG.9

| Name of Constant | 0 ≤ vehicle speed < 15 | 15 ≤ vehicle speed < 25 | 25 ≤ vehicle speed |
|---|---|---|---|
| CNPR | -97.5 | -78.0 | -55.5 |
| CNPL | 97.5 | 78.0 | 55.5 |
| CNPCR | -97.5 | -78.0 | -55.5 |
| CNPCL | 97.5 | 78.0 | 55.5 |
| CNR | -34.5 | -34.5 | -34.5 |
| CNL | 34.5 | 34.5 | 34.5 |

VEHICLE CONTROL DEVICE, VEHICLE, VEHICLE CONTROL METHOD, AND NON-TRANSITORY COMPUTER-READABLE MEDIUM STORING VEHICLE CONTROL PROGRAM

CROSS-REFERENCE TO RELATED APPLICATION

This application claims priority from Japanese Application No. 2022-086360, filed on May 26, 2022, the entire disclosure of which is incorporated herein by reference.

BACKGROUND

Technical Field

The present disclosure relates to a vehicle control device that controls turning on and turning off of a turn signal, a vehicle, a vehicle control method, and a non-transitory computer-readable medium storing a vehicle control program.

Related Art

Japanese Patent Application Laid-Open (JP-A) No. 2011-088601, discloses a turn signal lighting control device that sets a large cancellation angle in response to an increase in a steering angle of a steering wheel, after the steering angle has exceeded a cancellation preparation angle with reference to a reference angle, which is a steering angle during straight travel of the vehicle, so as to thereby automatically turn off a turn signal at an appropriate timing, even if the road after a right or left turn is curved.

In a vehicle that obtains a large turning angle with a small steering angle, there is a possibility that a turn signal will be cancelled at a timing that is not intended by a driver in a situation such as when making a lane change or when stopping the vehicle at a shoulder of the road. Particularly in the case of a system that obtains a larger turning angle of a tire with a small steering angle as compared to a conventional vehicle, such as that of a steer-by-wire type vehicle, which does not have a mechanical coupling between the steering and a turning wheels, there is a possibility that the turn signal will be cancelled at a more markedly unintended timing.

SUMMARY

The present disclosure provides a vehicle control device, a vehicle, a vehicle control method, and a non-transitory computer-readable medium storing a vehicle control program that may suppress cancellation of a turn signal at a timing that is not intended by a driver.

A first aspect of the present disclosure is a vehicle control device including: a setting section configured to set, based on a vehicle speed, a transition condition of a turning angle of a tire for canceling a turn signal; and a control section configured to, in a case in which the turning angle of the tire satisfies the transition condition that has been set by the setting section due to a steering being steered while the turn signal is in an on state, carry out control to switch the turn signal to an off state.

According to the first aspect, the setting section sets the transition condition of the turning angle of the tire for canceling the turn signal, based on the vehicle speed.

The control section carries out control to switch the turn signal to the off state in a case in which the turning angle of the tire satisfies the transition condition that has been set by the setting section due to the steering being steered while the turn signal is in the on state. As a result, cancellation of the turn signal at a timing that is not intended by a driver may be suppressed, even in a system such as a steer-by-wire type vehicle, which can obtain a larger turning angle of a tire with a small steering angle as compared to a conventional vehicle.

In a second aspect of the present disclosure, in the first aspect, the setting section may set the transition condition including the turning angle, which becomes larger as the vehicle speed becomes lower.

According to the second aspect, unintended cancellation of the turn signal may be suppressed, even in a case in which the steering is steered excessively to carry out a correction operation when the vehicle speed is low.

In a third aspect of the present disclosure, in the first aspect or the second aspect, the transition condition may be defined as exceeding a predetermined first turning angle and becoming less than or equal to a predetermined second turning angle, and the setting section may be configured to set the first turning angle, or the first turning angle and the second turning angle, based on the vehicle speed.

According to the third aspect, it is possible to set a transition condition that may suppress cancellation of the turn signal that is not intended by the driver.

In a fourth aspect of the present disclosure, in any one of the first aspect to the third aspect, the control section may be configured to control the turn signal of the vehicle, which is installed with a vehicle steering device in which a relationship between a steering angle of the steering and the turning angle changes based on the vehicle speed.

According to the fourth aspect, it is possible to suppress cancellation of the turn signal at a timing that is not intended by the driver, in a vehicle installed with a steer-by-wire type vehicle steering device that does not have a mechanical coupling between the steering and turning wheels.

A fifth aspect is a vehicle installed with a vehicle control device that includes: a setting section configured to set, based on a vehicle speed, a transition condition of a turning angle of a tire for canceling a turn signal; and a control section configured to, in a case in which the turning angle of the tire satisfies the transition condition that has been set by the setting section due to a steering being steered while the turn signal is in an on state, carry out control to switch the turn signal to an off state.

A sixth aspect is a vehicle control method in which a computer carries out processing that includes: setting, based on a vehicle speed, a transition condition of a turning angle of a tire for canceling a turn signal; and, in a case in which the turning angle of the tire satisfies the transition condition that has been set due to a steering being steered while the turn signal is in an on state, carrying out control to switch the turn signal to an off state.

A seventh aspect is a non-transitory computer-readable medium storing a vehicle control program executable by a computer to perform processing that includes: setting, based on a vehicle speed, a transition condition of a turning angle of a tire for canceling a turn signal; and, in a case in which the turning angle of the tire satisfies the transition condition that has been set due to a steering being steered while the turn signal is in an on state, carrying out control to switch the turn signal to an off state.

According to the above-described aspects, the vehicle control device, the vehicle, the vehicle control method, and the non-transitory computer-readable medium storing a vehicle control program of the present disclosure may suppress cancellation of the turn signal at a timing that is not intended by the driver.

BRIEF DESCRIPTION OF THE DRAWINGS

Exemplary embodiments will be described in detail based on the following figures, wherein.

DETAILED DESCRIPTION

Figure 1:
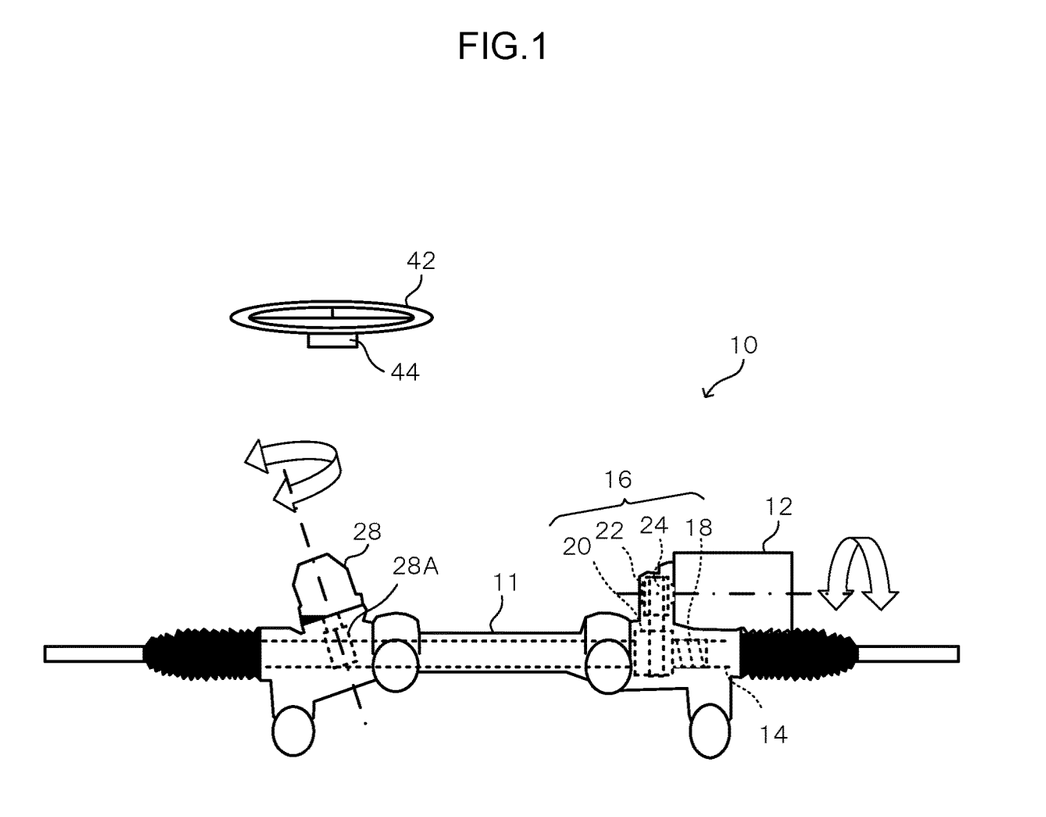
FIG. 1 is a diagram illustrating a schematic configuration of a vehicle steering device serving as a control target of a vehicle control device according to the present exemplary embodiment.

An example of an exemplary embodiment of the present disclosure will be explained in detail below with reference to the drawings. FIG. 1 is a diagram illustrating a schematic configuration of a vehicle steering device serving as a control target of a vehicle control device according to the present exemplary embodiment. It should be noted that, as an example of the vehicle steering device 10 according to the present exemplary embodiment, one of a type (so-called steer-by-wire type) in which a turning angle of a tire is changed with an electric signal, without the tire and a steering wheel being mechanically connected, will be explained. That is to say, a configuration is provided in which a steering angle sensor 44 that detects a steering angle of a steering 42 is provided, and the turning angle of the tire is changed by driving a motor 12 of the vehicle steering device 10 based on a detection result of the steering angle sensor 44.

More specifically, the vehicle steering device 10 is provided between front wheels among wheels (not illustrated in the drawings) that are provided at a vehicle.

The vehicle steering device 10 includes a motor 12, a rack bar 14, a conversion section 16, and a pinion angle detection sensor 28.

Each of the motor 12 and the pinion angle detection sensor 28 is fixed to a case 11, and each of the conversion section 16 and the rack bar 14 is provided within the case 11.

The motor 12 is provided at a position that is offset from a vehicle width direction center at one end side in the vehicle width direction. The conversion section 16 is connected to the motor 12, and rotation of the motor 12 is converted by the conversion section 16 into movement in an axial direction of the rack bar 14, which serves as a steering shaft, so as to apply driving force of the motor 12 to the rack bar 14, which is disposed along the vehicle width direction. The wheels are connected to the rack bar 14 via tie rods and knuckle arms, which are not illustrated in the drawings, and the wheels are steered by movement of the rack bar 14 in the vehicle width direction.

The conversion section 16 includes, for example, a pair of large and small pulleys (a small pulley 22 and a large pulley 20), a belt 24 wrapped around the small pulley 22 and the large pulley 20, and a transmission gear 18 connected to the large pulley 20. The small pulley 22 is connected to a rotation shaft of the motor 12, and the small pulley 22 is rotated by the motor 12. The rotation of the small pulley 22 is transmitted to the large pulley 20 via the belt 24, and the transmission gear 18 connected to the large pulley 20 is rotated. The transmission gear 18 engages with a gear formed at the rack bar 14, and the rack bar 14 is configured to move in the vehicle width direction due to rotation of the transmission gear 18.

The pinion angle detection sensor 28 is provided at a position offset from the vehicle width direction center at the other end side, which is an opposite side from the conversion section 16 of the vehicle steering device 10. The pinion angle detection sensor 28 includes a pinion gear 28A that engages with the gear of the rack bar 14, and detects a rotation angle of the pinion gear 28A by various sensors such as a magnetic sensor or the like. In the present exemplary embodiment, an amount of movement (rack stroke) of the rack bar 14 is detected by detecting the rotation angle of the pinion gear 28A engaged with the rack bar 14. It should be noted that, in place of the pinion angle detection sensor 28, a sensor of a type that directly detects the amount of movement of the rack bar 14 may be applied to convert the amount of movement to the rotation angle of the pinion gear 28A.

Figure 2:
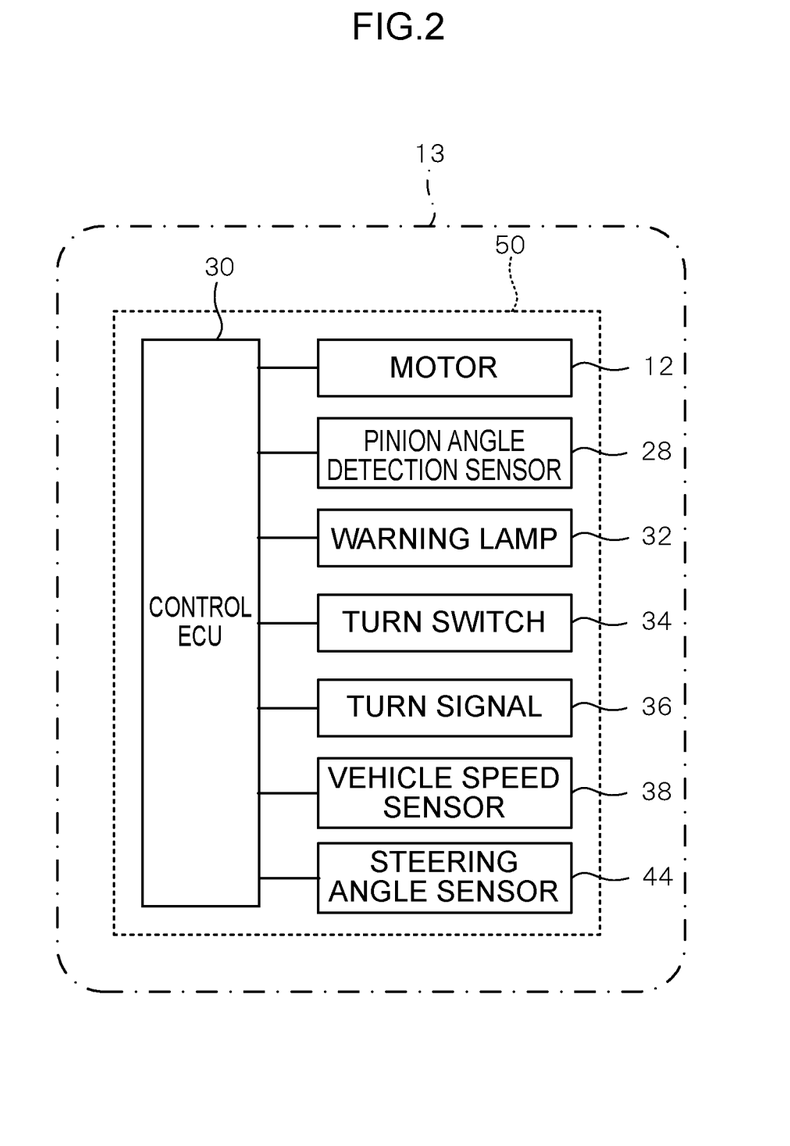
FIG. 2 is a block diagram illustrating a configuration of the vehicle control device according to the present exemplary embodiment.
Figure 3:
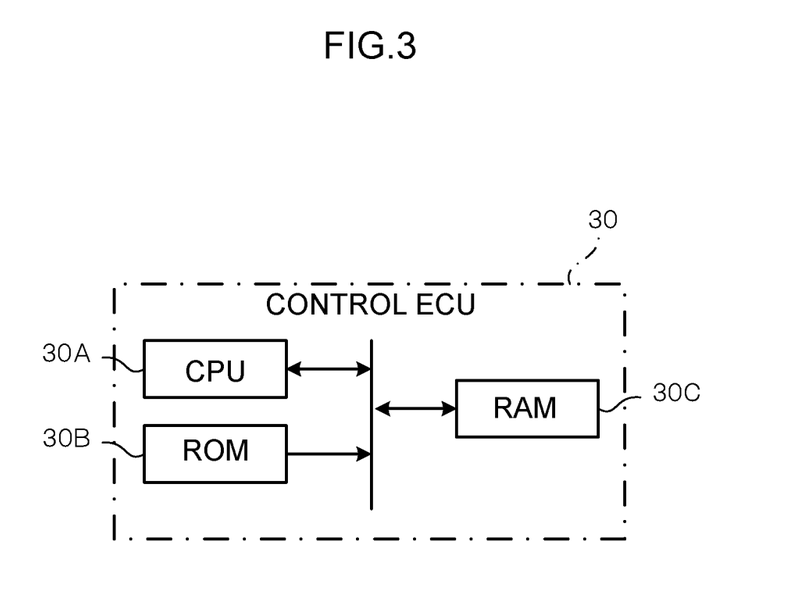
FIG. 3 is a block diagram illustrating a schematic configuration of a control ECU of the vehicle control device according to the present exemplary embodiment.

Next, a configuration of the vehicle control device according to the present exemplary embodiment will be explained. FIG. 2 is a block diagram illustrating the configuration of the vehicle control device 50 according to the present exemplary embodiment. FIG. 3 is a block diagram illustrating a schematic configuration of a control electronic control unit (ECU) 30 of the vehicle control device according to the present exemplary embodiment.

As illustrated in FIG. 2, the vehicle control device 50 is installed at a vehicle 13 and includes the control ECU 30 serving as an example of a setting section and a control section. The control ECU 30 performs drive control of the motor 12, control for turning on and turning off of a turn signal, and the like.

As illustrated in FIG. 3, the control ECU 30 is configured by a microcomputer including a central processing unit (CPU) 30A, a read only memory (ROM) 30B, a random access memory (RAM) 30C, and the like.

The CPU 30A is a central arithmetic processing unit and executes various programs to thereby control overall operation of the devices. The ROM 30B stores, in advance, various control programs, various parameters, and the like for controlling the vehicle steering device 10 and a lighting state of the turn signal 36. The RAM 30C is used as a workspace or the like during execution of various programs by the CPU 30A.

As illustrated in FIG. 2, the motor 12, the pinion angle detection sensor 28, a warning lamp 32, a turn switch 34, the turn signal 36, a vehicle speed sensor 38, and the steering angle sensor 44 are connected to the control ECU 30. It should be noted that, although the motor 12, the pinion angle detection sensor 28, the warning lamp 32, the turn switch 34, the turn signal 36, the vehicle speed sensor 38, and the steering angle sensor 44 are connected directly to the control ECU 30 in FIG. 2, in more detail, they are connected via a communication line such as a controller area network (CAN) or the like.

By being driven, the motor 12 moves the rack bar 14 in the vehicle width direction to thereby steer the wheels.

As described above, the pinion angle detection sensor 28 detects the rotation angle (pinion angle) of the pinion gear 28A by various sensors such as a magnetic sensor or the like.

The warning lamp 32 is provided at a combination meter or the like, and turns on to thereby warn that there is a possibility of an abnormality in the vehicle steering device 10.

The turn switch 34 is provided in the vicinity of the steering 42, and is operated in order to instruct turning on of the turn signal when turning right or left.

The turn signal 36 is provided at a front, a side, and a rear, or the like, of the vehicle 13, and blinks to display a travel direction change that has been instructed by the turn switch 34.

The vehicle speed sensor 38 detects a travel speed (hereafter referred to as a vehicle speed) of the vehicle 13, and outputs a detection result to the control ECU 30.

The steering angle sensor 44 detects a steering angle of the steering 42, and outputs a detection result to the control ECU 30.

The control ECU 30 performs drive control of the motor 12 and control of a lighting state of the turn signal 36. For example, the control ECU 30 controls driving of the motor 12 based on the detection results of the vehicle speed sensor 38 and the steering angle sensor 44, and controls the lighting state of the turn signal based on an operation state of the turn switch 34, and the detection results of the vehicle speed sensor 38 and the pinion angle detection sensor 28. Further, in a case in which an abnormality has been detected in the detection result of the pinion angle detection sensor 28, the control ECU 30 turns on the warning lamp 32 to inform an occupant of the abnormality in the vehicle steering device 10.

Next, drive control of the motor 12 performed by the control ECU 30 of the vehicle control device 50 according to the present exemplary embodiment will be explained.

Figure 4:
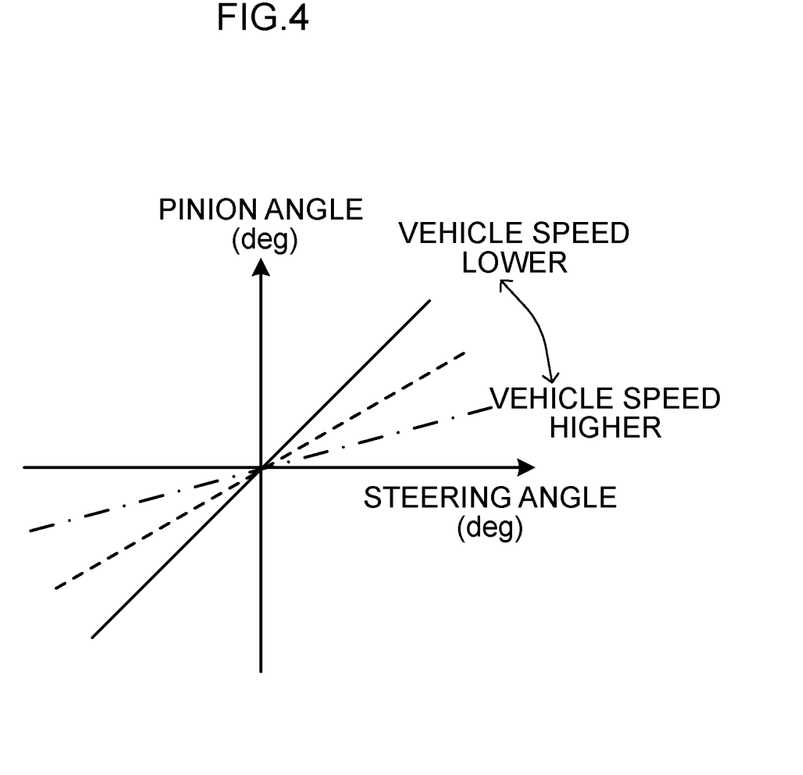
FIG. 4 is a diagram illustrating an example of a relationship between a steering angle of a steering and a pinion angle.
Figure 5:
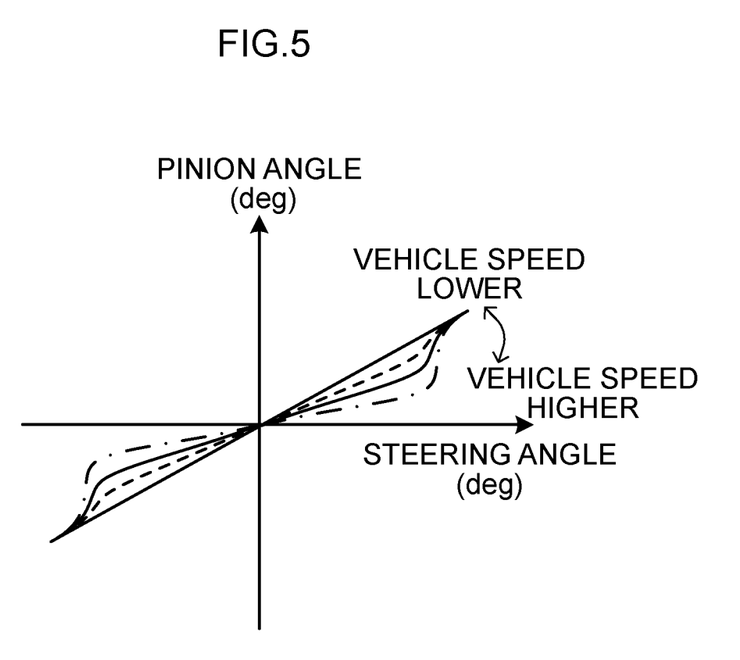
FIG. 5 is a diagram illustrating another example of a relationship between a steering angle of a steering and a pinion angle.

As described above, in the present exemplary embodiment, the vehicle steering device 10 is of a steer-by-wire type, and therefore, control is performed such that the steering angle of the steering 42 and the pinion angle corresponding to the turning angle of the tire have a predetermined relationship. For example, as illustrated in FIG. 4, the relationship between the steering angle of the steering 42 and the pinion angle is a proportional relationship in which the pinion angle increases with an increase in the steering angle, and the relationship between the steering angle of the steering 42 and the pinion angle is set for each vehicle speed. Although the relationship between the steering angle of the steering 42 and the pinion angle is explained as a proportional relationship in FIG. 4 in order to simplify the explanation, the relationship between the steering angle of the steering 42 and the pinion angle is not limited to a proportional relationship. For example, as illustrated in FIG. 5, the relationship may be curved. The relationship between the steering angle of the steering 42 and the pinion angle is set such that the lower the vehicle speed is, the larger the pinion angle with respect to the steering angle of the steering 42 is, and the higher the vehicle speed is, the smaller the pinion angle with respect to the steering angle of the steering 42 is. For example, in the examples in FIG. 4 and FIG. 5, the vehicle speed increases in the order of the relationship indicated by the solid line, the relationship indicated by the dotted line, and the relationship indicated by the dashed-dotted chain line.

Figure 6:
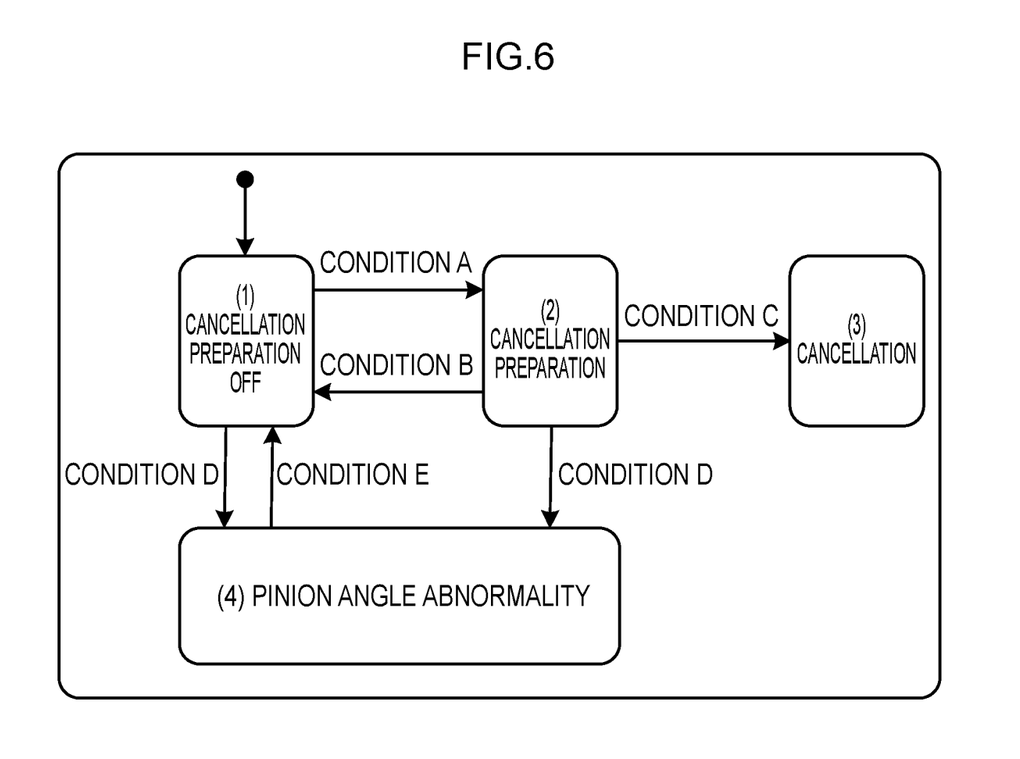
FIG. 6 is a state transition diagram in a case in which a turn switch has been operated.
Figure 7:
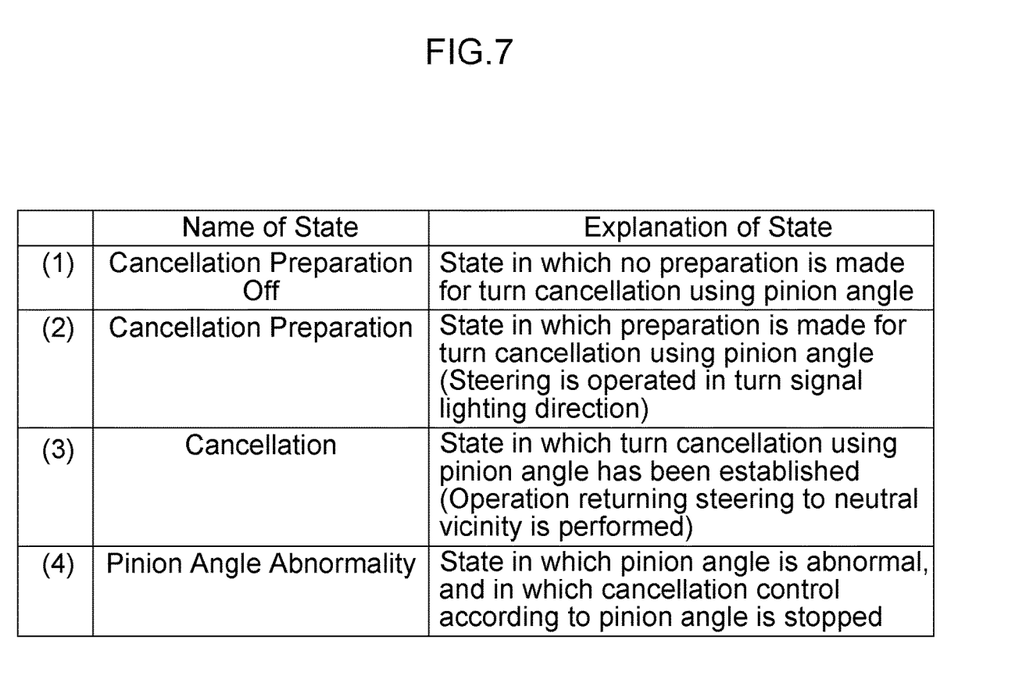
FIG. 7 is a diagram showing explanations of respective states in the state transition diagram.
Figure 8:
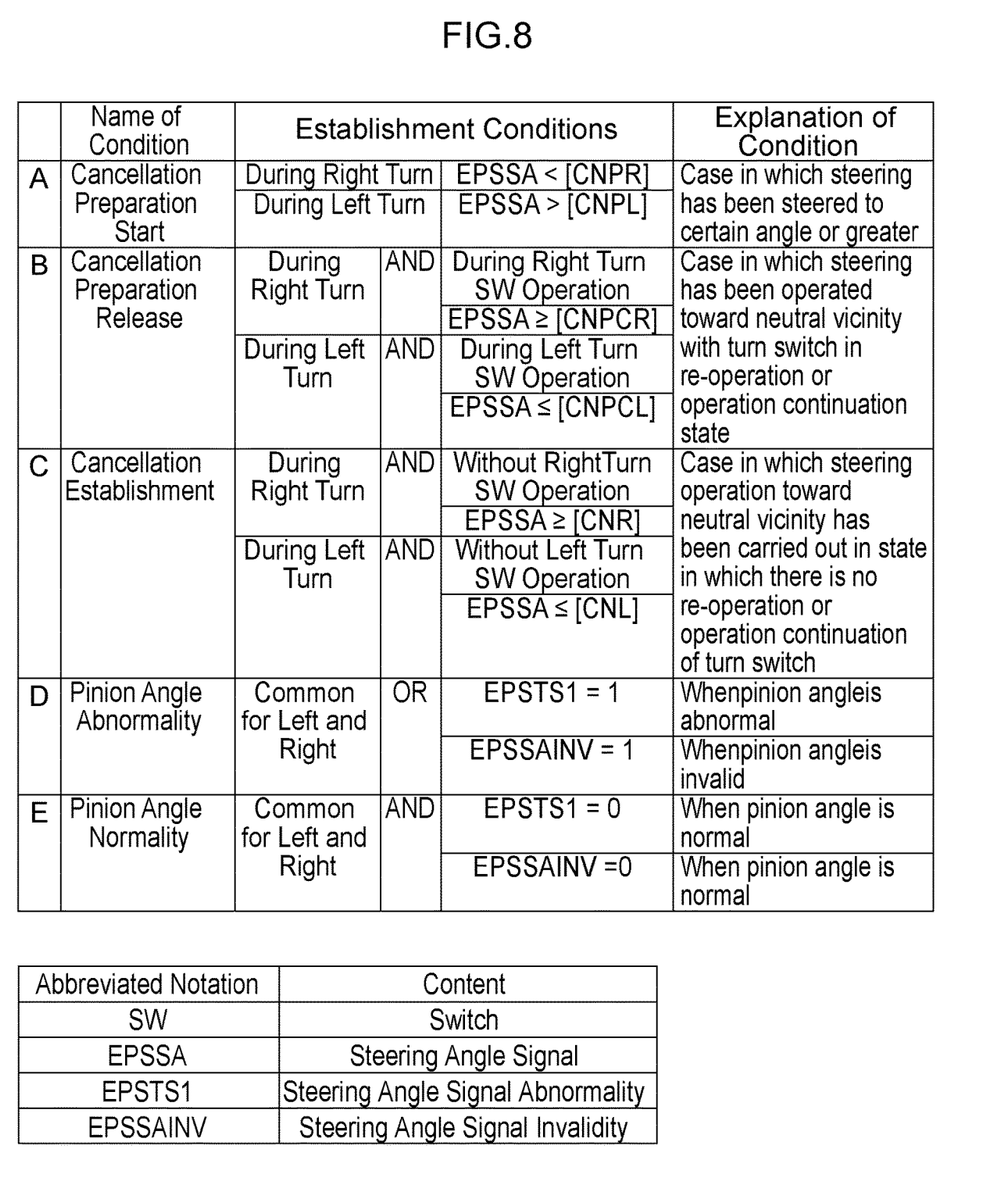
FIG. 8 is a diagram showing transition conditions for transitioning between respective states in the state transition diagram.
Figure 9:
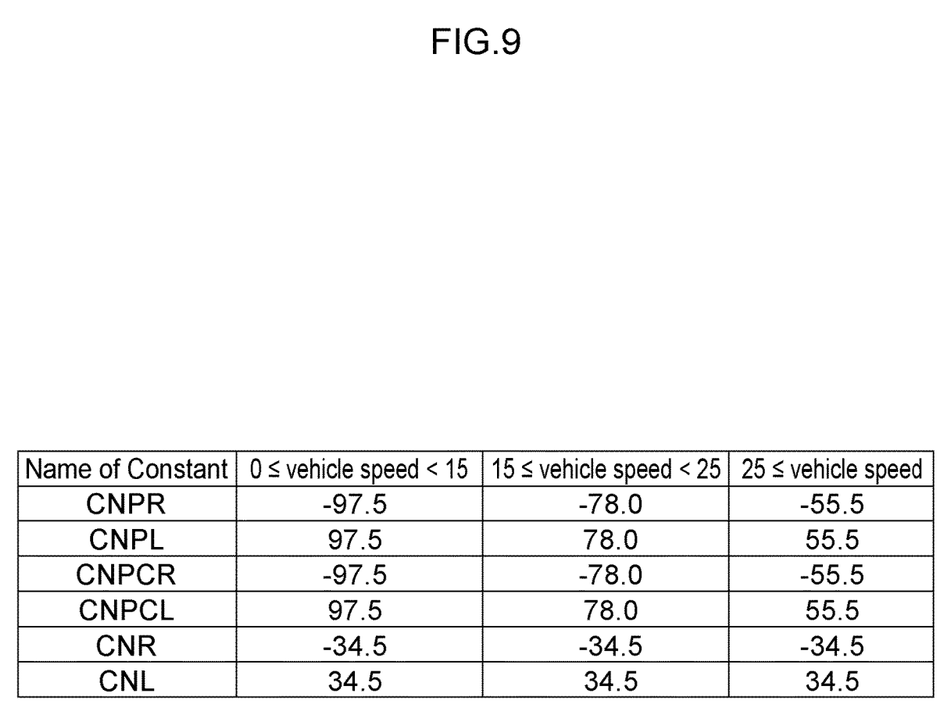
FIG. 9 is a diagram showing an example of constants in the transition conditions.

Next, control performed by the control ECU 30 when the turn switch 34 has been operated will be explained. FIG. 6 is a state transition diagram in a case in which the turn switch 34 has been operated, and FIG. 7 is a diagram showing explanations of respective states in the state transition diagram. Further, FIG. 8 is a diagram showing transition conditions for transitioning between respective states in the state transition diagram, and FIG. 9 is a diagram showing an example of constants in the transition conditions.

First, when the turn switch 34 is operated, the state transitions to a cancellation preparation off state of (1) in FIG. 6. The cancellation preparation off state is a state in which no preparation is made for turn cancellation using the pinion angle. It should be noted that turn cancellation using the pinion angle is processing for canceling the turn signal based on the detection result of the pinion angle detection sensor 28.

In a case in which a cancellation preparation start condition of a condition A has been satisfied in a turn cancellation preparation state, the state transitions to a cancellation preparation state of (2) in FIG. 6. The cancellation preparation state is a state in which preparation is made for turn cancellation using the pinion angle, and is a state in which the steering is operated in a lighting direction of the turn signal. Further, the condition A is that EPSSA (steering angle signal of pinion angle)<right cancellation preparation start angle CNPR at the time of a right turn, and that EPSSA>left cancellation preparation start angle CNPL at the time of a left turn, and is satisfied in a case in which the steering has been steered to a certain angle or greater. It should be noted that the right cancellation preparation start angle CNPR and the left cancellation preparation start angle CNPL correspond to an example of a first turning angle.

Furthermore, in a case in which a cancellation preparation release condition of a condition B has been satisfied in the turn cancellation preparation state, the state returns to the cancellation preparation off state. Condition B is that EPSSA>right cancellation preparation release angle CNPCR during right turn switch operation at the time of a right turn, and that EPSSA<left cancellation preparation release angle CNPCL during left turn switch operation at the time of a left turn, and is satisfied in a case in which the steering 42 has been operated toward a neutral vicinity with the turn switch 34 being in a re-operation or operation continuation state.

Further, in a case in which a cancellation establishment condition of a condition C has been satisfied in the turn cancellation preparation state, the state transitions to the cancellation state of (3) in FIG. 6, and control is carried out to switch the turn signal 36 to an off state. The cancellation state is a state in which turn cancellation using the pinion angle has been established, and is a state in which an operation to return the steering 42 to the neutral vicinity is performed. Condition C is that EPSSA>right cancellation angle CNR without right turn switch operation at the time of a right turn, and that EPS SA<left cancellation angle CNL without left turn switch operation at the time of a left turn, and is satisfied in a case in which steering operation toward the neutral vicinity has been carried out in a state in which there is no re-operation or operation continuation of the turn switch 34. It should be noted that the right cancellation angle CNR and the left cancellation angle CNL correspond to an example of a second turning angle.

Furthermore, in a case in which a pinion angle abnormality condition of a condition D has been satisfied in the cancellation preparation off state or the cancellation preparation state, the state transitions to a pinion angle abnormality state of (4) in FIG. 6. The pinion angle abnormality state is a state in which the pinion angle is abnormal, and is a state in which cancellation control according to the pinion angle is stopped. The condition D is that EPSTS1=1 or EPSSA-INV=1, commonly for both left and right, and is satisfied when the pinion angle is abnormal or when the pinion angle is invalid.

Further, in a case in which a pinion angle normality condition of a condition E has been satisfied in the pinion angle abnormality state, the state returns to the cancellation preparation off state. The condition E is that EPSTS1=0 and SPSSAINV=0, commonly for both left and right, and is satisfied when the pinion angle is normal.

Incidentally, in the vehicle 13, which obtains a large turning angle with a small steering angle, if the turn signal 36 is cancelled using a constant tire turning angle as a threshold, there is a possibility that the turn signal 36 will be cancelled at a timing that is not intended by the driver, as in the conventional art. For example, in a situation such as when making a lane change or when stopping the vehicle at a shoulder of the road, since the tire turning angle becomes large with a small steering angle, there may be cases in which the turn signal 36 is cancelled by a correction operation. Particularly, in the vehicle steering device 10 of the steer-by-wire type, since the relationship between the steering angle of the steering 42 and the turning angle of the tire changes according to the vehicle speed as in the present exemplary embodiment, the tire turning angle may become larger than a tire turning angle that the driver has aimed for at a low speed, and the turn signal 36 may be cancelled by an operation for returning the steering.

Accordingly, in the present exemplary embodiment, the constants (CNPR, CNPL, CPPCR, PNCPL, CNR, and CNL) of the conditions for transitioning to the respective states are configured to be set according to the vehicle speed. Namely, in the present exemplary embodiment, the lower the speed is, the larger the steering angle that the threshold of the steering angle (pinion angle) at which the turn signal 36 is turned off is set to be. As a result, it becomes less likely for cancellation of the turn signal 36 at a timing that is not intended by the driver to occur at a low speed.

More specifically, the constants of the conditions for transitioning to the respective states are set as shown in FIG. 9, and the constants are changed according to the vehicle speed. It should be noted that the constants in FIG. 9 are merely an example, and are not limited to the values shown in FIG. 9.

FIG. 9 shows an example in which the vehicle speed is classified into three vehicle speed ranges, which are 0≤vehicle speed<15, 15<vehicle speed<25, and 25≤vehicle speed, and a constant is determined for each vehicle speed range. More specifically, steering angles of −97.5, −78, and −55.5 are set for the right cancellation preparation start angle CNPR of the constant used in the cancellation preparation start condition of the condition A, and steering angles of 97.5, 78, and 55.5 are set for the left cancellation preparation start angle CNPL, in this order from the low vehicle speed range. Further, steering angles of −97.5, −78, and −55.5 are set for the right cancellation preparation release angle CNPCR of the constant used in the cancellation preparation release condition of the condition B, and steering angles of 97.5, 78, and 55.5 are set for the left cancellation preparation release angle CNPCL, in this order from the low vehicle speed range. Furthermore, a steering angle of −34.5 is set for the right cancellation angle CNR of the constant used in the cancellation establishment condition of the condition C, and a steering angle of 34.5 is set for the left cancellation angle CNL, in each vehicle speed range. It should be noted that the minus side represents the right direction and the plus side represents the left direction. Further, although constant values are applied to the right cancellation angle CNR and the left cancellation angle CNL in FIG. 9, they may be different values for each vehicle speed.

Figure 10:
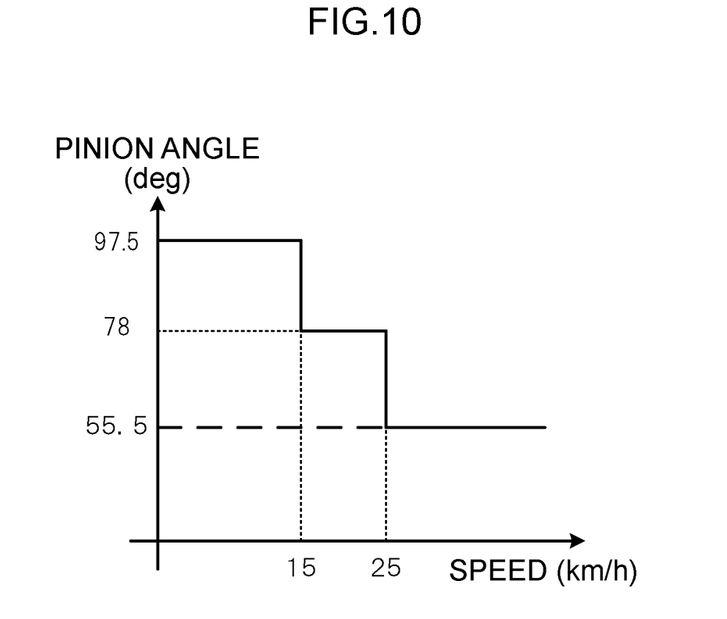
FIG. 10 is a diagram illustrating an example of change in a cancellation preparation start angle and a cancellation preparation release angle according to a vehicle speed, and a conventional cancellation angle.

In the present exemplary embodiment, the cancellation preparation start angle (CNPR, CNPL) when transitioning to the cancellation preparation state, and the cancellation preparation release angle (CNPCR, CNPCL) when transitioning to the cancellation preparation off state are changed according to the vehicle speed, as illustrated in FIG. 10. Namely, the transition condition of the pinion angle at which the turn signal is cancelled is changed according to the vehicle speed. As a result, it becomes less likely for cancellation of the turn signal 36 at a timing that is unintended by the driver to occur at a low speed, compared to a case in which cancellation is performed at a constant angle (such as, for example, 55.5°) as in the related art. It should be noted that the solid line in FIG. 10 represents the cancellation angle of the turn signal of the present exemplary embodiment, and that the dashed line shows an example of a conventional constant cancellation angle.

Figure 11:
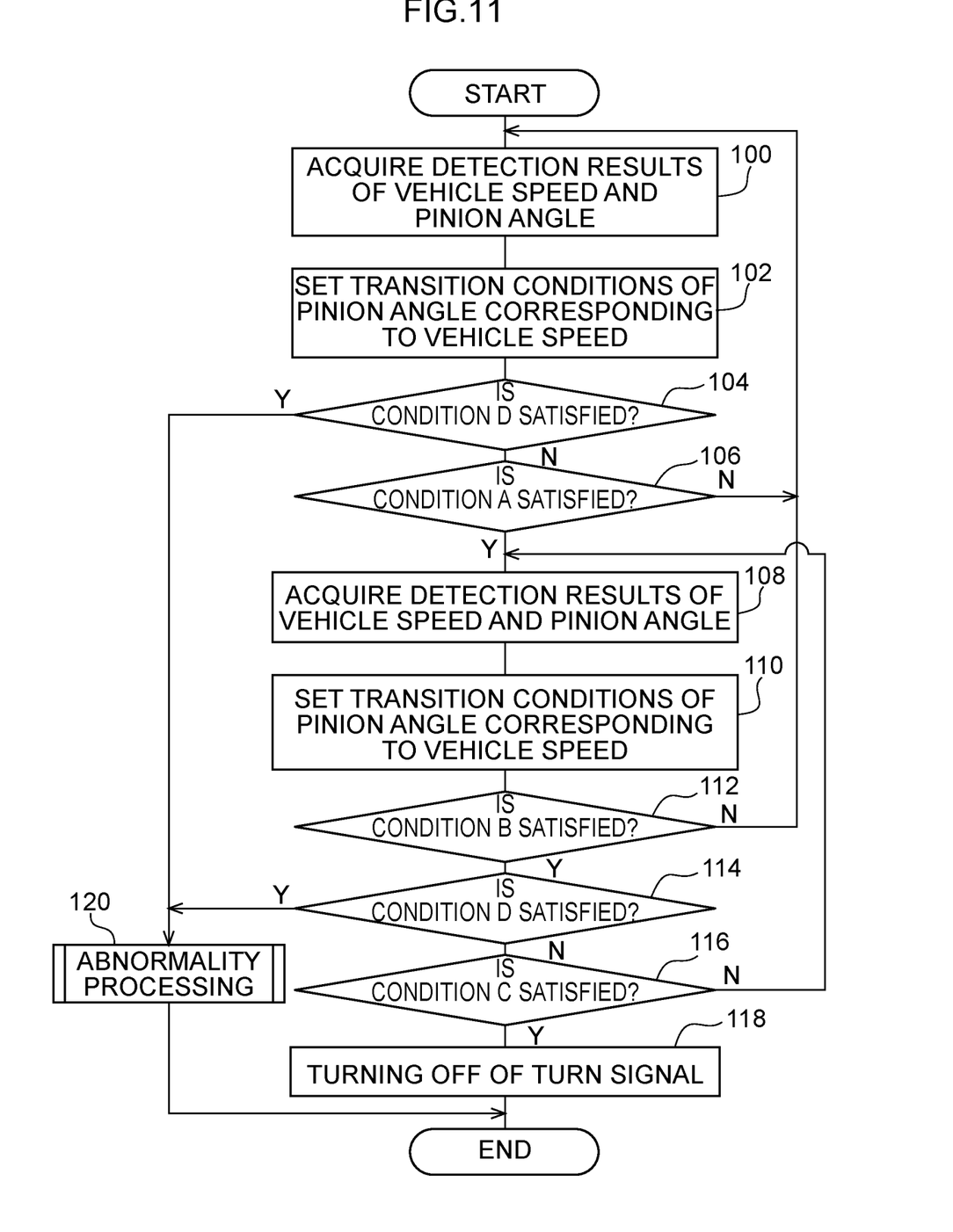
FIG. 11 is a flowchart illustrating an example of a flow of processing performed by the control ECU of the vehicle control device according to the present exemplary embodiment.

Next, specific processing performed by the control ECU 30 of the vehicle control device 50 according to the present exemplary embodiment configured as described above will be explained. FIG. 11 is a flowchart illustrating an example of a flow of processing performed by the control ECU 30 of the vehicle control device 50 according to the present exemplary embodiment. It should be noted that the processing of FIG. 11 is started, for example, in a case in which the turn switch 34 has been operated by the driver to transition to the cancellation preparation off state.

At step 100, the CPU 30A acquires the detection results of the vehicle speed and the pinion angle, and the processing transitions to step 102. Namely, the detection results of the vehicle speed sensor 38 and the pinion angle detection sensor 28 are acquired.

At step 102, the CPU 30A sets the transition conditions of the pinion angle corresponding to the detected vehicle speed, and the processing transitions to step 104. Namely, the cancellation preparation start angle (CNPR, CNPL) when transitioning to the cancellation preparation state, and the cancellation preparation release angle (CNPCR, CNPCL) when transitioning to the cancellation preparation off state, are set to the angles corresponding to the detected vehicle speed.

At step 104, the CPU 30A determines whether or not the condition D has been satisfied. Namely, it is determined whether or not EPSTS1=1 or EPSSAINV=1 of the pinion angle abnormality condition has been satisfied. In a case in which the determination is negative, the processing transitions to step 106, and in a case in which the determination is affirmative, the processing transitions to step 120.

At step 106, the CPU 30A determines whether or not the condition A has been satisfied. Namely, it is determined whether or not EPSSA<right cancellation preparation start angle CNPR or EPSSA>left cancellation preparation start angle CNPL. In a case in which the determination is affirmative, the processing transitions to step 108, and in a case in which the determination is negative, the processing returns to step 100, and the processing described above is repeated.

At step 108, the CPU 30A acquires the detection results of the vehicle speed and the pinion angle, and the processing transitions to step 110. Namely, the detection results of the vehicle speed sensor 38 and the pinion angle detection sensor 28 are acquired.

At step 110, the CPU 30A sets transition conditions of the pinion angle corresponding to the detected vehicle speed, and the processing transitions to step 112. Namely, the cancellation preparation start angle (CNPR, CNPL) when transitioning to the cancellation preparation state, and the cancellation preparation release angle (CNPCR, CNPCL) when transitioning to the cancellation preparation off state, are set to angles corresponding to the detected vehicle speed.

At step 112, the CPU 30A determines whether or not the condition B has been satisfied. Namely, it is determined whether or not EPSSA>right cancellation preparation release angle CNPCR during right turn switch operation, or EPSSA<left cancellation preparation release angle CNPCL during left turn switch operation. In a case in which the determination is affirmative, the processing transitions to step 114, and in a case in which the determination is negative, the processing returns to step 100, and the processing described above is repeated.

At step 114, the CPU 30A determines whether or not the condition D has been satisfied. Namely, it is determined whether or not EPSTS1=1 or EPSSAINV=1 of the pinion angle abnormality condition has been satisfied. In a case in which the determination is negative, the processing transitions to step 116, and in a case in which the determination is affirmative, the processing transitions to step 120.

At step 116, the CPU 30A determines whether or not the condition C has been satisfied. Namely, it is determined whether or not EPSSA>right cancellation angle CNR without right turn switch operation, or EPSSA<left cancellation angle CNL without left turn switch operation. In a case in which the determination is affirmative, the processing transitions to step 118, and in a case in which the determination is negative, the processing returns to step 108, and the processing described above is repeated.

At step 118, the CPU 30A performs control to switch the turn signal 36 to an off state, and the series of processing is ended.

On the other hand, when the condition D is satisfied and the processing transitions to step 120, at step 120, the CPU 30A performs abnormality processing, and the series of processing is ended.

Figure 12:
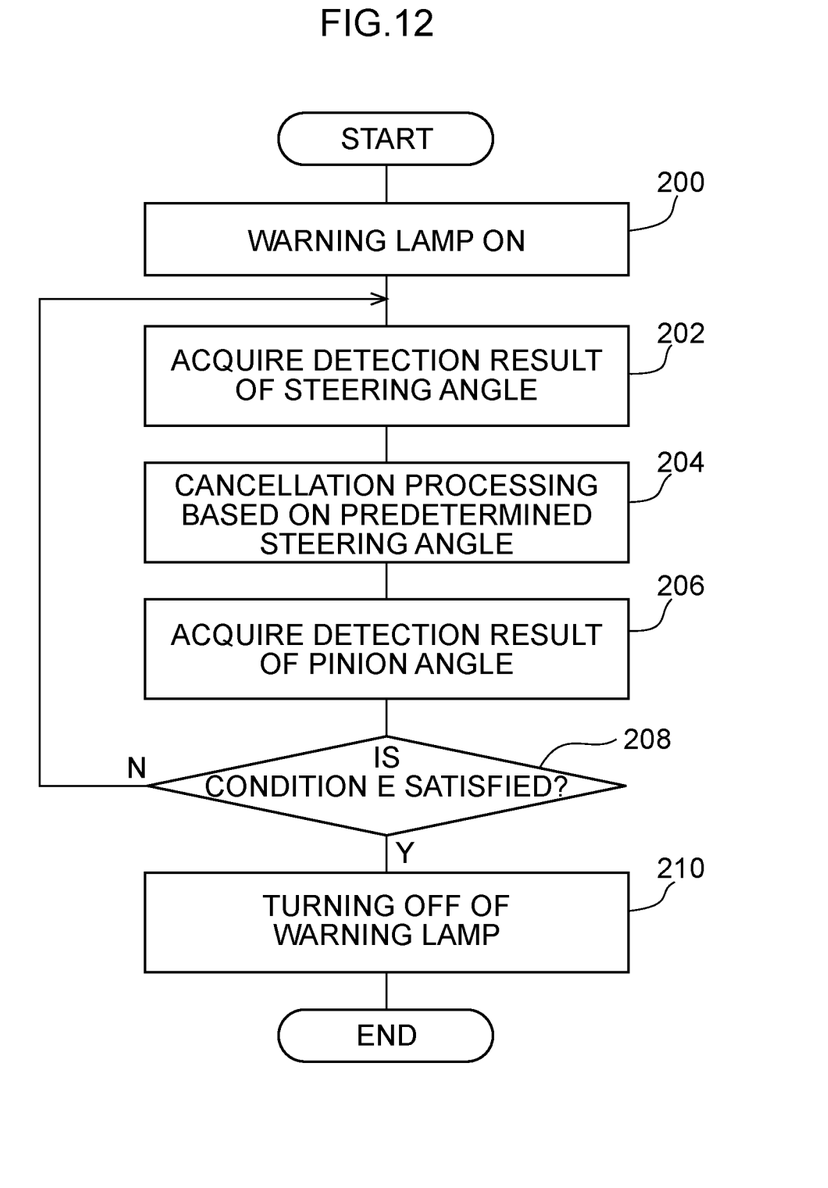
FIG. 12 is a flowchart illustrating an example of a flow of abnormality processing.

The flow of the abnormality processing will be explained in detail with reference to FIG. 12. FIG. 12 is a flowchart illustrating an example of the flow of the abnormality processing.

At step 200, the CPU 30A turns on the warning lamp 32 to thereby inform the driver of an abnormality in the pinion angle, and the processing transitions to step 202.

At step 202, the CPU 30A acquires the detection result of the steering angle, and the processing transitions to step 204. Namely, the detection result of the steering angle sensor 44 is acquired.

At step 204, the CPU 30A performs cancellation processing based on a predetermined steering angle, and the processing transitions to step 206. Namely, as in the related art, the turn signal 36 is turned off using a predetermined steering angle as a threshold. For example, the turn signal 36 is turned off in a case in which the steering 42 is operated to a steering angle that is larger than the predetermined steering angle and then the steering 42 is operated to a steering angle that is equal to or less than the predetermined steering angle. This enables processing to cancel the turn signal using the steering angle, as a fail-safe in a case in which the pinion angle is abnormal.

At step 206, the CPU 30A acquires the detection result of the pinion angle, and the processing transitions to step 208. Namely, the detection result of the pinion angle detection sensor 28 is acquired.

At step 208, the CPU 30A determines whether or not the condition E has been satisfied. Namely, it is determined whether or not EPSTS1=0 and SPSSAINV=0. In a case in which the determination is negative, the processing returns to step 202, and the processing described above is repeated, and in a case in which the determination is affirmative, the processing transitions to step 210.

At step 210, the CPU 30A turns off the warning lamp 32, and the series of abnormality processing is ended.

Figure 13:
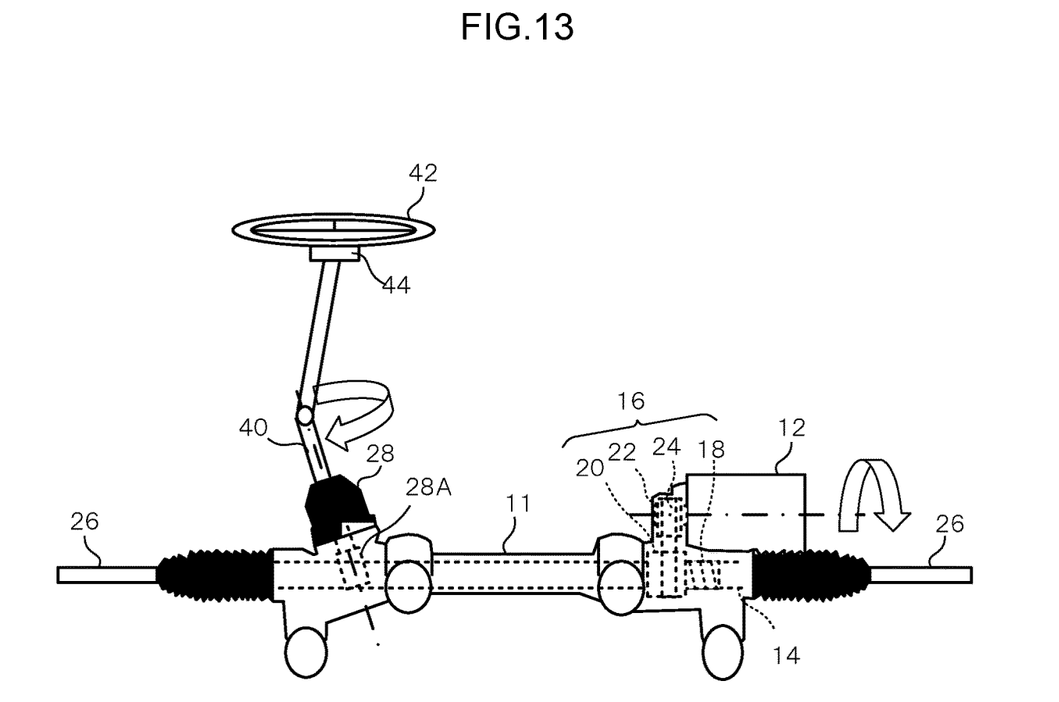
FIG. 13 is a diagram illustrating a schematic configuration of a vehicle steering device in which a steering rod, to which a steering is connected, is connected to a pinion gear.

It should be noted that, although the vehicle steering device 10 of a steer-by-wire type has been explained as an example in the exemplary embodiment described above, there is no limitation thereto. For example, as illustrated in FIG. 13, a general vehicle steering device may be applied in which a steering rod 40 that is connected to the steering 42 is connected to the pinion gear 28A.

Further, although a configuration in which control is carried out by the single control ECU 30 has been explained in the exemplary embodiment described above, a configuration in which plural ECUs are linked together may be adopted. For example, a configuration may be adopted in which a meter ECU to which the warning lamp and the like are connected, and a steering ECU that controls the vehicle steering device, are linked together.

Furthermore, although the constant of the cancellation preparation start angle and the constant of the cancellation preparation release angle are the same in the exemplary embodiment described above, there is no limitation thereto, and different constants may be used for each of these. For example, different constants may be set according to the characteristics of the vehicle 13.

Further, although the processing carried out by the control ECU 30 in the exemplary embodiment described above has been explained as software processing that is carried out by executing a program, there is no limitation thereto. For example, the processing may be performed using hardware such as a graphics processing unit (GPU), an application specific integrated circuit (ASIC), a field-programmable gate array (FPGA) or the like. Alternatively, a configuration may be provided in which the processing combines both software and hardware. Furthermore, in a case in which software processing is employed, a configuration may be provided in which the programs are stored on various storage media and distributed.

Moreover, the present disclosure is not limited to that which is described above, and it is obvious that the present disclosure can be implemented by making various modifications other than those described above, within a range that does not depart from the gist of the present disclosure.

What is claimed is:

1. A vehicle control device configured to control turning on and turning off of a turn signal of a host vehicle, the vehicular display control device comprising:
   a memory; and
   a processor coupled to the memory, the processor being configured, by executing a vehicle control program stored in the memory to:
   set, based on a vehicle speed, a transition condition of a turning angle of a tire for canceling a turn signal,
   in a case in which the turning angle of the tire satisfies the transition condition that has been set, due to a steering wheel being steered while the turn signal is in an on state, carry out control to switch the turn signal to an off state,
   in a case in which the turning angle of the tire satisfies a predetermined abnormal condition, inform a driver of an abnormality in the turning angle of the tire, and turn off the turn signal using a predetermined steering angle of a steering wheel as a threshold, and
   in a case in which the turning angle of the tire no longer satisfies the abnormal condition, end the informing of the abnormality.

2. The vehicle control device according to claim 1, wherein the processor is configured to set the transition condition including the turning angle, which becomes larger as the vehicle speed becomes lower.

3. The vehicle control device according to claim 1, wherein:
   the transition condition is defined as exceeding a predetermined first turning angle and becoming less than or equal to a predetermined second turning angle, and
   the processor is configured to set the first turning angle, or the first turning angle and the second turning angle, based on the vehicle speed.

4. The vehicle control device according to claim 1, wherein the processor is configured to control the turn signal of the vehicle, which is installed with a vehicle steering device in which a relationship between a steering angle of the steering and the turning angle changes based on the vehicle speed.

5. The vehicle control device according to claim 1, wherein the processor:
   acquires the steering angle from a steering angle sensor that detects the steering angle of the steering wheel,
   acquires the turning angle of the tire from a pinion angle detection sensor that detects the turning angle of the tire, and
   in a case in which an abnormality occurs in the turning angle of the tire, turns off the turn signal when the steering angle acquired from the steering angle sensor becomes equal to or less than a predetermined steering angle.

6. A vehicle control method executed by a computer that controls turning on and turning off of a turn signal of a host vehicle the vehicle control method comprising:
   setting, based on a vehicle speed, a transition condition of a turning angle of a tire for canceling a turn signal;
   in a case in which the turning angle of the tire satisfies the transition condition that has been set, due to a steering being steered while the turn signal is in an on state, carrying out control to switch the turn signal to an off state;
   in a case in which the turning angle of the tire satisfies a predetermined abnormal condition, informing a driver of an abnormality in the turning angle of the tire, and turning off the turn signal using a predetermined steering angle of a steering wheel as a threshold; and
   in a case in which the turning angle of the tire no longer satisfies the abnormal condition, ending the informing of the abnormality.

7. A non-transitory computer-readable storage medium on which is stored a vehicle control program for controlling turning on and turning off of a turn signal of a host vehicle, the vehicle control program being executable by a computer to perform processing, the processing comprising:
   setting, based on a vehicle speed, a transition condition of a turning angle of a tire for canceling a turn signal;
   in a case in which the turning angle of the tire satisfies the transition condition that has been set, due to a steering being steered while the turn signal is in an on state, carrying out control to switch the turn signal to an off state;
   in a case in which the turning angle of the tire satisfies a predetermined abnormal condition, informing a driver of an abnormality in the turning angle of the tire, and turning off the turn signal using a predetermined steering angle of a steering wheel as a threshold; and
   in a case in which the turning angle of the tire no longer satisfies the abnormal condition, ending the informing of the abnormality.

\* \* \* \* \*